Nov. 15, 1938.　　H. W. GRAUNKE　　2,136,972

AUXILIARY AUTOMOBILE FLOOR

Filed June 19, 1937　　2 Sheets-Sheet 1

Inventor:
Harry W. Graunke.
By Francis H. Templeton
Attorney

Nov. 15, 1938.    H. W. GRAUNKE    2,136,972
AUXILIARY AUTOMOBILE FLOOR
Filed June 19, 1937    2 Sheets-Sheet 2
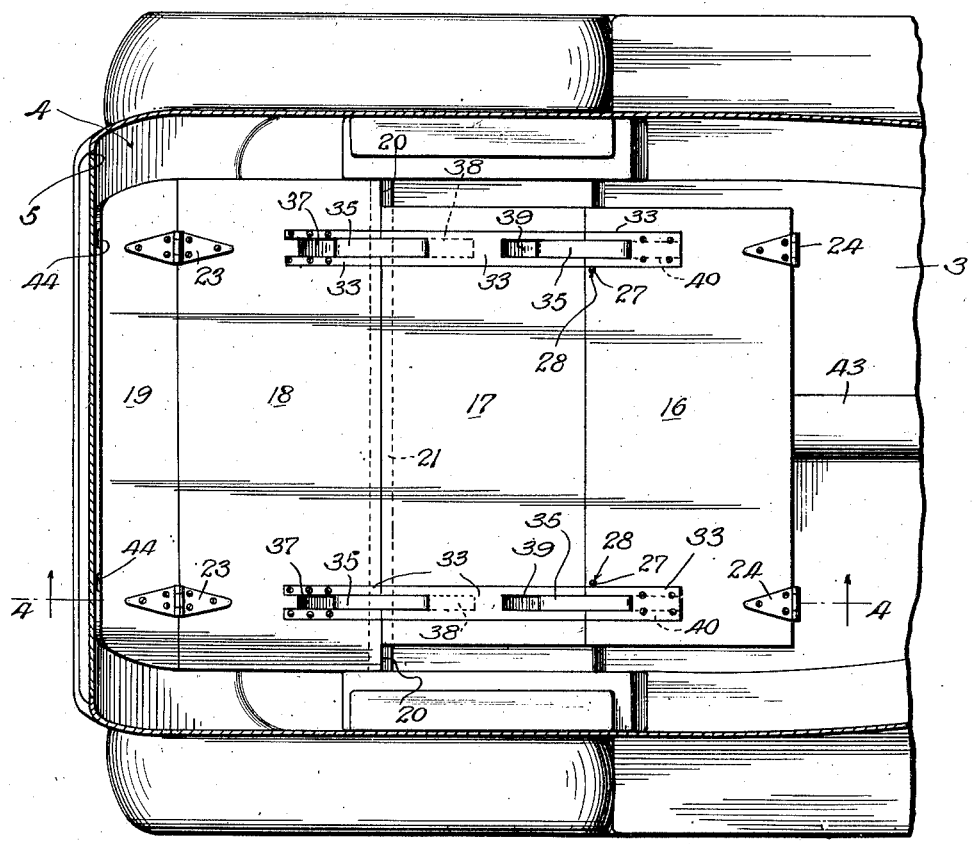
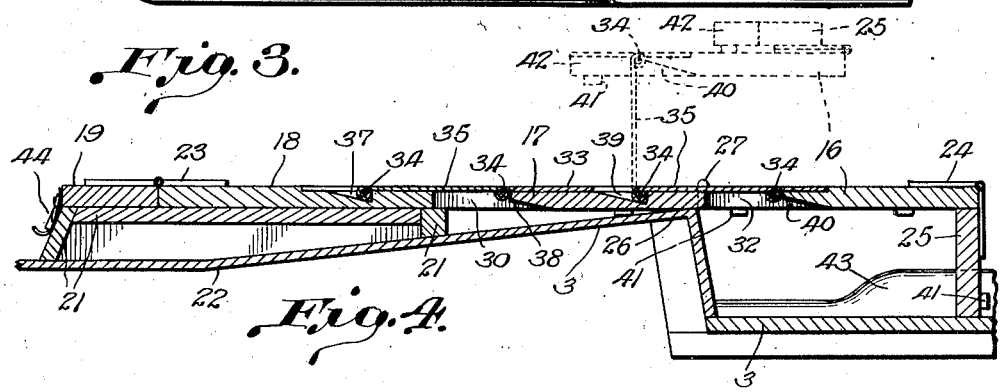
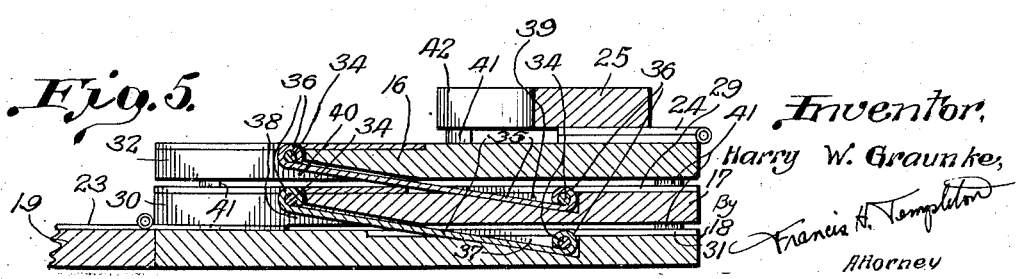
Inventor,
Harry W. Graunke,
By Francis H. Templeton
Attorney Patented Nov. 15, 1938

2,136,972

UNITED STATES PATENT OFFICE 2,136,972

AUXILIARY AUTOMOBILE FLOOR

Harry William Graunke, Cedar Falls, Iowa

Application June 19, 1937, Serial No. 149,279

2 Claims. (Cl. 296—24)

This invention relates to means for adapting an automobile for purposes in addition to the carrying of passengers in the ordinary way.

My invention more specifically relates to the provision of an auxiliary floor permitting, when in retracted or inoperative position, an automobile to be used in the normal manner of transporting persons, and also permitting, when in extended or operative position, such automobile to be used for ambulance, delivery, sleeping and other purposes, without destroying the value of the automobile for passenger purposes.

My auxiliary floor is simple in construction, of relatively few parts, strong to withstand wear and strain in use, and easily and quickly moved into either extended or retracted position.

Various other objects and advantages of the invention will be obvious from the following particular description of an embodiment of my invention.

The various features of novelty which characterize my invention are pointed out with particularity in the claims annexed hereto and forming a part of this specification, but for a better understandng of the invention, however, its advantages and specific objects attained with its use, reference should be had to the accompanying drawings and descriptive matter in which I have illustrated and described the best form of my invention.

In the accompanying drawings:—

Fig. 3 is a section along the line 3—3 of Fig. 1.

Fig. 4 is a section along the line 4—4 of Fig. 3.

Fig. 5 is a detailed view, on an enlarged scale, of my auxiliary floor in retracted position.

Figure 1:
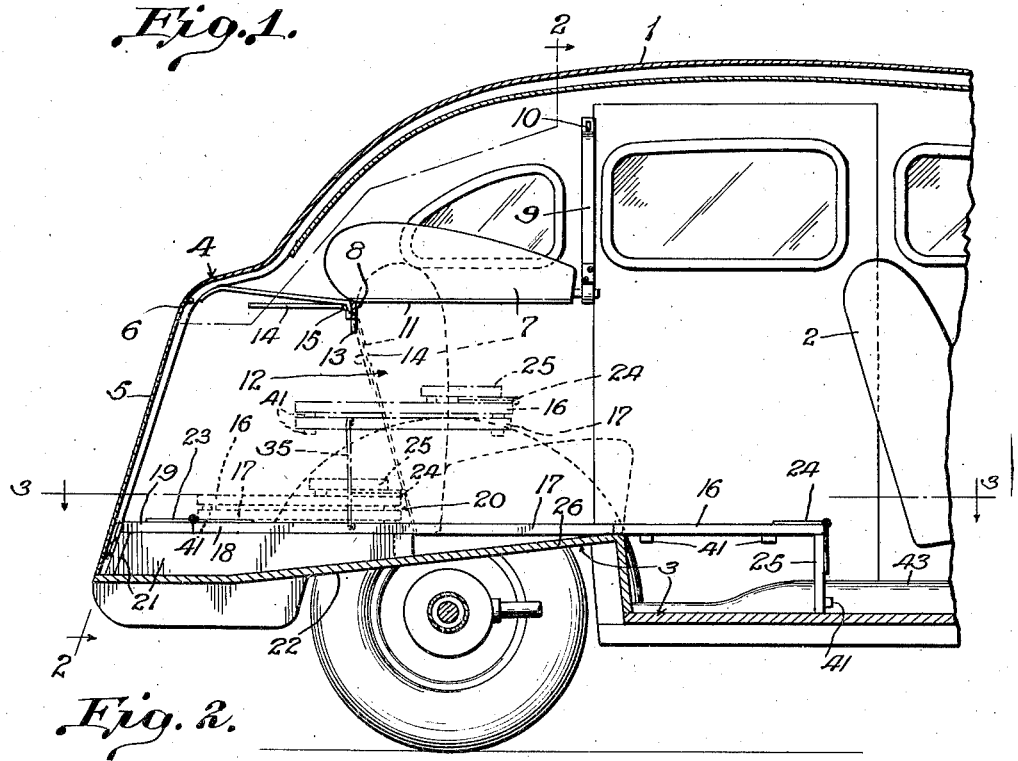
Fig. 1 is a longitudinal section through an automobile showing my auxiliary floor in extended and in intermediate and in retracted positions.

This invention is adapted for use with different makes of automobiles, and may be originally embodied in a car during manufacture, or installed therein subsequent to its leaving the factory.

As shown in the drawings, the automobile has a top 1, a front seat 2, a fixed car floor 3 and a trunk 4, and the invention is shown applied to a standard make of automobile, after its manufacture, which has the rear built-in trunk 4 provided with a door 5 opening at the bottom and hinged at the top as at 6, but it is obvious that the invention could be used in other car and trunk types and that changes could be made in the details of the illustrated arrangement without departing from the spirit of the invention.

As in the usual construction, the seat cushion of the rear seat is removable, while the back cushion 7 of the rear seat is hung from the top frame of the car by hooks 8, and straps 9 attached to the lower edge of such back cushion near the ends thereof permit such back cushion to be swung upwardly and held in substantially horizontal position by hooks 10 in the car top. This permits such back cushion of the rear seat to be either bodily removed from the car when desired, or swung upwardly into out-of-the-way position to be held adjacent the top of the car. The back side of the back cushion of the rear seat is covered with a sheet of pressed board 11 or other suitable material so as to form the back of the trunk when the car is used as a passenger vehicle in the usual way.

The trunk and car body proper may communicate with each other by a maximum unobstructed opening 12 commensurate substantially with the full inside height and width of the trunk where it joins or merges into the car body proper. Where possible to achieve this maximum opening without seriously weakening the car structure, any braces or solid partition ordinarily found between the trunk and car body proper could be removed. However, in the event of such maximum opening requiring additional reinforcement for the car structure, a brace 13 may be constructed of angle or other suitable form of structural steel and so shaped as to conform to the edge of such maximum opening between the trunk and body of the car.

Figure 2:
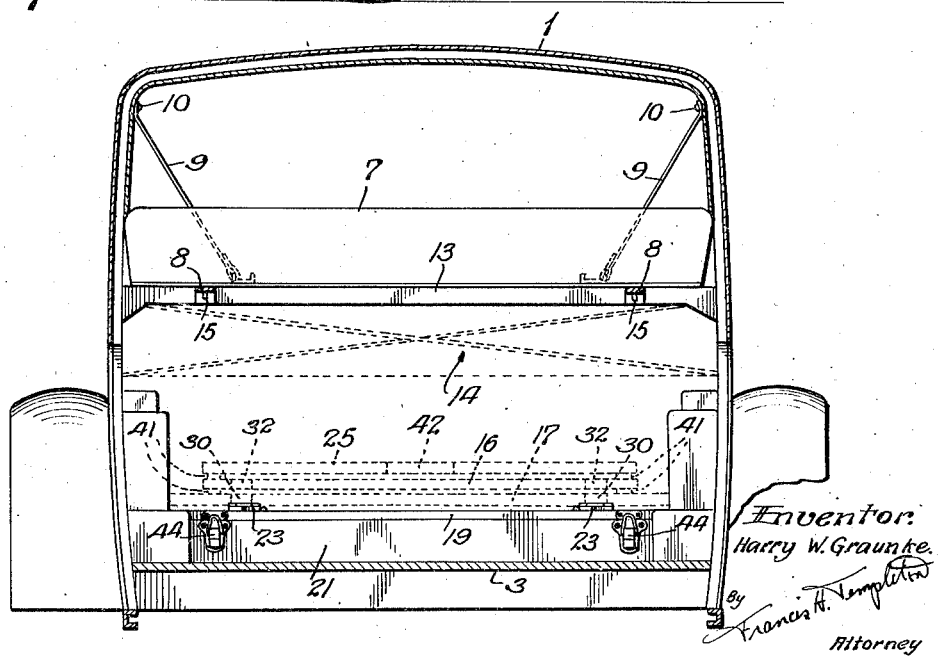
Fig. 2 is a section along the line 2—2 of Fig. 1.

Although a maximum unobstructed opening such as just described may be convenient and desirable for some purposes to which the invention may be put, as for example, for sliding a stretcher bearing a patient through the opened trunk on into the body of the car, it is to be noted that such maximum opening might not always be necessary, because a much more restricted opening would be sufficient for some purposes. Braces 14 are shown extending across the upper part of such maximum opening, and still providing plenty of "leg room" for sleeping purposes, for example, when it is required only to extend the feet through the restricted opening into the trunk. Being hinged at 15, such braces are permitted to hang downwardly, as shown in Fig. 2, with their side edges contacting the side walls of the opening between the trunk and car body proper, and thus provide added reinforcement at that part of the car structure, and at the same time allow sufficient opening beneath such braces to permit of certain uses, such as for sleeping purposes. Obviously such braces can be swung upwardly into the out-of-the-way position shown in full lines in Fig. 1 to thereby provide a maximum unobstructed opening when desired or necessary. It is by reason of the particular hinging of this device, hereinafter described, that a restricted opening, substantially half that required by ordinary hinging, is adequate for certain uses of my invention, as above referred to.

As shown, my auxiliary floor comprises sections 16, 17, 18 and 19, designated for convenience as forward section 16, middle section 17, rear section 18 and flap section 19. Of these, the rear section is preferably rigidly mounted over the solid trunk floor of the car body and extends forwardly to the line of division 20 between the trunk and car body proper. Hinged to this rear section is the middle section, to which in turn is hinged the forward section 16. In extended or operative position, the auxiliary floor is preferably horizontal. A box framework 21 is provided of whatever shape and dimensions necessary to support the rear section at the proper level, and as shown in the drawings, this box framework tapers forwardly by reason of the car floor 22 sloping upwardly from the rear toward the front of the trunk. This box framework may be used for the storage of tools, etc., and in order to make it accessible, the flap section 19 is hinged at 23 to lift up at a point adjacent the trunk door 5, while in lowered or closed position the flap section lies in the same plane with and forms a continuation of the rear section 18.

To the forward edge of the forward section is hingedly attached, as at 24, a foot 25 for the support of the forward section at the proper level. This foot 25 folds back to lie flat on the top of the forward section 16 and, together with the forward and middle sections, is movable back into the trunk when not in use. If necessary, portions of any sections of the floor may be cut out in order that they may pass, in moving back and forth, any projection at the side of the body or trunk easily. As shown in the drawings, the middle section rests on rear seat frame 26 and pins 27, which project upwardly from the rear seat frame 26 to hold the rear seat cushion when in place, fit holes 28 formed in the middle section and help to hold the entire floor from shifting during movement of the automobile.
The flap section 19 preferably extends rearwardly to a point adjacent the bottom of the trunk door when closed, and should be of sufficient length to permit tools etc. to be inserted and removed from the tool box underneath such flap and rear sections. The length of the rear section is preferably from the forward edge of the flap section to the line of rest of the rear seat cushion, which is substantially the line of division 20 between the trunk and car body proper. The length of each of the forward and middle sections is preferably one half the distance from the forward edge of the rear section to a point adjacent the back of the front seat.

Briefly, as to operation, the middle section is so connected to the rear section as to be shifted so as to lie flat on the top of the rear section. Similarly, the forward section is so connected to the middle section that it can be shifted so as to lie flat on top of the middle section. Thus, assuming that the floor lies extended, as shown in Figs. 1, 3 and 4, all that is necessary to do in order to move it to retracted position, is to first fold the foot back on top of the forward section and then to shift the forward section, with the superimposed foot, back to lie on the middle section, and then as a final step to shift such middle section, forward section and foot, all together, in superposed position, back to rest on top of the rear section in the trunk. Fig. 1 shows an intermediate position in the final shift of all the movable sections 16 and 17 and foot 25 back into retracted position in the trunk, where the inner edges of all three superimposed sections may form the backrest for the back cushion of the back seat.

For connecting the forward and middle sections, and for connecting the middle and rear sections, I provide hinge or link structure. Adjacent or slightly spaced from each side edge of the middle section, a recess 29 extends inwardly from the forward edge of such middle section, on the upper face thereof, for a distance substantially equal to one-fourth of the length of the middle section. Adjacent or slightly spaced from each side edge of the middle section, a notch 30 extends inwardly from the rear edge of the middle section for a distance substantially equal to one-fourth of the length of such middle section. Also a recess 31 of the same size as recess 29, just described, is formed in the forward edge of the rear section and extending inwardly on the upper face thereof at such a distance from each side edge of the rear section that adjacent recess 31 and notch 30 of rear and middle sections, respectively, register or are in line. Similarly, a notch 32 is formed in the rear edge of the forward section of a size similar to notch 30 and at such a distance from each side edge of such forward section as to make adjacent notch 32 and recess 29 of the forward and middle sections, respectively, register or be in line.

As shown in the drawings, the entire edge of each notch and of each recess is framed by a metal plate 33. Across each notch opening, near the inner end thereof, a pin 34 extends from one side of such plate to the other. As shown in Fig. 5, at the inner end of recess 29, a pin 34 spans the width of such recess and lies below the level of the bottom of such recess. Similarly, at the inner end of recess 31, a pin 34 spans the width of such recess and lies below the level of the bottom of such recess.

Each link member is of similar construction and as shown comprises a flat metal plate 35 having its opposite ends rolled, as at 36, around pins 34, in oppositely positioned notch and recess, respectively, of adjacent sections. The length of each link is preferably substantially one-half of the length of the middle or of the forward section, and its thickness is such as to permit the link to lie flush with the upper face of the sections when the floor is in extended or operative position, as shown in Fig. 4. Furthermore, the depth of recess 29 is preferably substantially the same as the thickness of the link which fits therein so that the link may lie therein with the upper face of such link flush with the upper surface of the sections when the floor is in extended or operative position, as shown in Fig. 4. Similarly, recess 31 has a depth sufficient to permit a link to lie therein flush with the top surface of the sections when in extended position, as shown in Fig. 4. In order that the links may thus lie flush, the pins, to which they are connected, must be mounted below the surface of the section a distance equal to the thickness of each link and lie parallel to the plane of the upper face of such section.

Adjacent each pin of the rear section, the upper face of the rear section is recessed at 37, as shown in Figs. 4 and 5, to receive the link when the middle section is shifted to lie upon the rear section. Adjacent each rear pin of the middle section, the under side of the middle section is recessed at 38, as shown in Figs. 4 and 5, to receive the link when the middle section is shifted to lie flat on the rear section. A recess 39, similar to recess 37, is formed in the upper face of the middle section adjacent each pin in the forward edge of such middle section, and a recess 40, similar to recess 38, is formed in the under face of the forward section adjacent each pin mounted therein. Each of such recesses is shown in the drawings as inclined or tapered, and of a length that need be no greater than one-half the length of such link, and of an extreme depth that need be no greater than twice the thickness of said link plus the diameter of the pin mounted therein. The length and the depth of each recess may vary but should be sufficient to easily receive such link member and permit the sections to lie flat on one another when in retracted position in the trunk.

Pads of rubber 41 or other suitable material are mounted on portions of the sections so as to lie between the sections to reduce noise and prevent rattling of such sections in retracted position in the trunk. The foot is formed with a notch 42 to fit over the housing 43 of the drive shaft when the floor is in extended position. Clamps or hasps 44 or other suitable fastening means may be attached for locking the flap section closed on the tool box. In one embodiment of my invention, the sections have been made of boards about three-fourths inch thick, but plywood or other wood or metal or other suitable material of any appropriate dimensions may be used in constructing the sections.

Although in the foregoing description and accompanying drawings, my auxiliary floor is mounted as close to the fixed floor of the car as permitted by the structural limitations of the particular make of automobile in which it is embodied, it is contemplated that the entire level of my auxiliary floor might be raised to provide greater space than the tool box disclosed, so as to be able to carry a spare tire or other article inside the trunk underneath my auxiliary floor. Even such an arrangement, necessarily restricting the size of opening between trunk and car body proper would permit my auxiliary floor to operate, because of the low head room required by my sections and their method of hinging.

Assuming that the sections are in retracted position in the trunk, whenever it is desired to make use of my auxiliary floor, it is only necessary to first remove the bottom cushion of the back seat and swing the back cushion of the back seat upwardly into the full line position shown in Fig. 1, or detach such back cushion from the supporting hooks and bodily remove the same out of the car, as in case, for example, it is desired to use the car for ambulance purposes and provide maximum head room for an attendant to sit alongside a patient on the stretcher, for which latter there is ample room between the rear of the front seat of the car and the closed door of the trunk.

In extending the sections, the trunk door may be opened or not as desired, but in the event of either, the movable sections, i. e., the middle and forward sections, may be maintained horzontal while being raised into the intermediate position shown in Fig. 1 and may be maintained horizontal during the entire remainder of the movement through the intermediate position illustrated in Fig. 4 down to the final extended position of the sections in which the forward section lies in edge-abutting relation to the middle section, and the middle section, in turn, engages the edge of the rear section, to thus provide a continuous level floor from the rear of the front seat to the door of the trunk.

By reason of the link structure provided, it is possible for such movable sections, during movement into either retracted or extended position, to remain parallel with each other and with the fixed rear section at every stage of such movement, and hence it is possible for such movable sections to move through a restricted opening substantially equal in height to the combined length of a link and the thickness of two such superposed movable sections.

Although they could be substituted for the recesses 29 and 31, notches such as 30 and 32 are not necessary here to permit the swinging of the links, as are the notches 30 and 32, into their positions shown in Fig. 5, and furthermore the recesses aid in aligning the movable sections much better than the notches would do during the final shift to final extended position.

From the foregoing description taken with the accompanying drawings, it is apparent that I have devised a structure that is admirably adapted for the purposes for which it is intended to be used. Obviously, the sections in retracted position take up very little space in the trunk and yet are instantly available for movement into operative or extended position, where my auxiliary floor may be used for ambulance purposes or for sleeping purposes or for transporting farmer's produce or for carrying salesman's samples or for a wide variety of other uses. Of special importance is the fact of the automobile being usable for such purposes in addition to passenger purposes in the usual way, and this without any cutting of side posts or walls of the car or disfiguring the automobile in the slightest.

Having thus described my invention, what I claim as new and desire to secure by Letters Patent is:

1. In an automobile and trunk provided with an opening therebetween, an auxiliary floor comprising a fixed section rigidly mounted in said trunk and a plurality of movable sections housed in retracted position within said trunk and movable through said opening into extended position in said automobile, and means connecting all of said sections for superposing said movable sections in substantially parallel relation to said fixed section in said trunk.

2. In an automobile and trunk provided with an opening therebetween, an auxiliary floor comprising a fixed section rigidly mounted in said trunk and a plurality of movable sections, said movable sections in retracted position lying in said trunk in superposed relation to said fixed section, said movable sections being extensible from said retracted position through said opening into unfolded position in said automobile, a pivot pin spaced from an edge of each of said sections by a distance substantially one-fourth of the length of each movable section, and a link connecting opposite pivot pins in adjacent sections, said links being hinged to each of said sections intermediate the width of such section, each of said movable sections being formed with notches and recesses adjacent said links to permit such links to lie wholly within the outer surfaces of said movable sections when in either extended or retracted position.

HARRY WILLIAM GRAUNKE.